United States Patent
Sano et al.

[11] Patent Number: 5,564,680
[45] Date of Patent: Oct. 15, 1996

[54] HYDROPNEUMATIC, SELF-PUMPING, TELESCOPIC SHOCK ABSORBER, PARTICULARLY FOR MOTOR VEHICLES

[75] Inventors: Katsuyuki Sano, Toyota; Osamu Yasuike, Numazu; Kimitoshi Kato, Kariya; Kenji Hayashi, Toyoake; Tamotsu Furukawa, Nagoya; Hiroyuki Terada, Aichi; Hideyuki Kobayashi, Toyota, all of Japan

[73] Assignees: Toyota Jidosha Kabushiki Kaisha, Aichi-Ken; Aisin Seiki Kabushiki Kaisha, Kariya, both of Japan

[21] Appl. No.: 383,102

[22] Filed: Feb. 3, 1995

[30] Foreign Application Priority Data

Feb. 21, 1994 [JP] Japan ................................. 6-022759

[51] Int. Cl.⁶ ............................................. B60G 17/044
[52] U.S. Cl. ............................................... 267/64.17
[58] Field of Search ................................. 188/269, 282, 188/312, 313, 320, 322.15, 322.21; 267/218, 64.15, 64.16, 64.17, 64.26, 64.28

[56] References Cited

U.S. PATENT DOCUMENTS

| | | |
|---|---|---|
| 3,250,526 | 5/1966 | Kress . |
| 3,497,199 | 2/1970 | Tuczek ........................ 267/64.17 |
| 3,547,465 | 12/1970 | Hohenlimburg et al. . |
| 3,567,244 | 3/1971 | Hoffmann et al. .............. 280/708 |
| 4,214,775 | 7/1980 | Taft . |
| 4,325,567 | 4/1982 | Hendrickson ................... 280/711 |
| 4,368,878 | 1/1983 | Meller et al. . |
| 4,408,773 | 10/1983 | Meller et al. . |
| 4,577,840 | 3/1986 | Meller et al. ................. 267/64.17 |
| 4,993,693 | 2/1991 | Lohr et al. ................... 267/64.17 |
| 5,062,616 | 11/1991 | Sommer ...................... 267/64.17 |

FOREIGN PATENT DOCUMENTS

| | | |
|---|---|---|
| 20 60 157.4 | 6/1971 | Germany . |
| 52-45573 | 11/1977 | Japan . |
| 2135422 | 8/1984 | United Kingdom . |
| 2159235 | 11/1985 | United Kingdom . |

OTHER PUBLICATIONS

"Self–Energizing Hydropneumatic Levelling Systems," Society of Automotive Engineers, Inc. (SAE), Technical Paper Series 780052 (1978).

*Primary Examiner*—Josie Ballato
*Attorney, Agent, or Firm*—Oliff & Berridge

[57] ABSTRACT

A hydropneumatic shock absorber includes an inlet valve and an outlet valve. The inlet valve opens when the piston moves in a contracting direction so that fluid is sucked into a pump chamber, and the outlet valve opens when the piston moves in an extending direction so that the fluid is discharged from the pump chamber into a high-pressure operating chamber. Thus, the pressure in the high-pressure operating chamber does not increase when the wheel bounces, and the oscillation encountered while the vehicle is traveling is properly absorbed so that good riding comfort is realized.

16 Claims, 13 Drawing Sheets

HYDROPNEUMATIC, SELF-PUMPING, TELESCOPIC SHOCK ABSORBER, PARTICULARLY FOR MOTOR VEHICLES

BACKGROUND OF THE INVENTION

1. Field of the Invention

The present invention relates to a hydropneumatic shock absorber, and more particularly to a hydropneumatic, self-pumping, telescopic shock absorber constructed to support a vehicle, as a part of a suspension of the vehicle, and thus to maintain a vehicle at a constant height irrespective of different loading conditions.

2. Description of the Prior Art

Generally, each of the wheels of a vehicle is supported by a suspension, and a shock applied to each wheel is absorbed by a shock absorber of the suspension contracting. Specifically, when a shock absorber contracts, a damping force occurs due to resistance of a fluid filling a cylinder. When a vehicle is traveling on a road having an irregular surface, the shock is softened by the damping force before being transmitted to a vehicle body.

However, the shock absorber also contracts when the number of passengers or the weight of a load changes. This contraction of the shock absorber causes the height of the vehicle to change. Thus, a sufficient amount of contraction of the suspension cannot be secured. As a result, desired levels of riding comfort and driving stability cannot be obtained.

For this reason, hydropneumatic shock absorbers such as the ones disclosed in "Self-Energizing Hydropneumatic Leveling Systems" (Society of Automotive Engineers, INC (SAE), Technical Paper Series 780052) have been developed recently. These shock absorbers are operated to maintain a vehicle at a constant height when the number of passengers or the weight of a load has changed.

A conventional hydropneumatic shock absorber unit is equipped with a high-pressure operating chamber filled with a fluid pressurized by a high-pressure gas, a low-pressure operating chamber filled with a fluid whose pressure is controlled by a low-pressure gas, and an inner cylinder whose interior communicates with the high-pressure operating chamber.

A piston fixed to one end of a piston rod of the hydropneumatic shock absorber is inserted in the interior of the inner cylinder. A pump mechanism for transporting the fluid in the low-pressure operating chamber to the interior of the inner cylinder while the piston slides during the compression of the shock absorber unit, and a mechanism for returning the fluid in the inner cylinder to the low-pressure operating chamber when the piston moves beyond a predetermined position during the extension of the unit are built in the piston.

When the piston moves in a contracting direction beyond the predetermined position, the pressure in the inner cylinder increases as the vehicle travels and the piston slides inward. As a result, the piston is forced toward the piston rod, that is, in a direction in which the hydropneumatic shock absorber extends, due to a difference between areas to which the pressure is applied. When the piston has reached the predetermined position, the pressure of the inner cylinder does not increase even if the piston slides further. When the piston moves in the extending direction beyond the predetermined position, the pressure in the inner cylinder decreases. Thus, the piston, which is held inside the cylinder, is maintained adjacent to the predetermined position.

Therefore, when the height of the vehicle in which the above-mentioned pneumatic shock absorber is mounted decreases as a result of an increase in the number of passengers, the weight of the luggage or the like, the pressure on the piston increase as the vehicle travels. When the height of the vehicle decreases as a result of a decrease in the number of passengers, the weight of luggage or the like, the pressure on the piston decreases until the piston is at the predetermined position. The vehicle is thus maintained at a constant height at which the piston is at the predetermined position.

However, the above described hydropneumatic shock absorber is constructed such that the fluid in the low-pressure chamber is transported to the inner cylinder when the wheel bounces (the piston moves in the contracting direction). That is, the above described hydropneumatic shock absorber is constructed such that the transportation of the fluid for moving the piston in the extending direction is performed while the piston moves in the contracting direction.

As a result, there occurs a great damping force when the wheel bounces. When an upward force is applied by the road to the wheel, or when the load of the vehicle is applied downward, a comparatively large shock is transmitted to the vehicle body as a counter force against the damping force. In this respect, the above described hydropneumatic shock absorber has a disadvantage in that the riding comfort is impaired when the wheel bounces.

Another disadvantage of the above described hydropneumatic shock absorber is that an excessive amount of fluid is transported to the inner cylinder and the high-pressure chamber when the vehicle travels over a rough road characterized by continuous irregularities (that is, when the piston undergoes repeated strokes each having a long duration), thereby impairing the riding comfort.

SUMMARY OF THE INVENTION

Accordingly, an object of the present invention is to provide an improved hydropneumatic shock absorber in which the aforementioned disadvantages are eliminated.

Another and more specific object of the present invention is to provide a hydropneumatic shock absorber in which no excessively large shock is transmitted to the vehicle body when the wheel bounces.

The aforementioned objects of the present invention can be achieved by a hydropneumatic shock absorber comprising:

a cylinder having a fluid chamber filled with fluid;

a high-pressure operating chamber which communicates with said fluid chamber;

a piston slidably provided in said fluid chamber in said cylinder;

a hollow piston rod having said piston at one end and being filled with the fluid;

a pump piston which, slidably provided in said hollow piston rod, partitions a space in said hollow piston rod into a pump chamber formed near said piston and a low-pressure chamber formed opposite said piston;

a hollow pump rod which has said pump piston at one end, said cylinder fixed to its other end, and a communication passage communicating with said low-pressure chamber;

a low-pressure operating chamber which communicates with the communicating passage which said hollow pump rod has;

an inlet valve which opens so as to allow the fluid in said low-pressure chamber to be sucked by said pump chamber when said piston moves in a contracting direction; and an outlet valve which opens so as to allow the fluid in said pump chamber to be discharged into said fluid chamber in said cylinder.

According to the present invention, in which an inlet valve sucks the fluid in the low-pressure operating chamber into the pump chamber and an outlet valve discharges the fluid in the pump chamber into the high-pressure operating chamber, the inlet valve opens when the piston moves in the contracting direction and the outlet valve opens when the piston moves in the extending direction. The fluid in the low-pressure operating chamber is sucked into the pump chamber in a process in which the piston moves in the contracting direction, and the fluid in the pump chamber is discharged into the high-pressure operating chamber in a process in which the piston moves in the extending direction. Accordingly, resistance accompanying the sliding action of the piston does not increase during a bouncing action of the wheel, and the oscillation encountered while the vehicle is traveling is properly absorbed so that good riding comfort is realized. Additionally, the shock absorber unit according to the present invention is compact because the low-pressure chamber is formed in the hollow piston rod.

The aforementioned objects of the present invention can also be achieved by a hydropneumatic shock absorber comprising:

a cylinder having a fluid chamber filled with a fluid;

a high-pressure operating chamber which communicates with said fluid chamber;

a piston slidably provided in said fluid chamber in said cylinder;

a hollow piston rod having said piston at one end and being filled with the fluid;

a pump piston which, slidably provided in said hollow piston rod, partitions a space in said hollow piston rod into a pump chamber formed near said piston and a low-pressure chamber formed opposite said piston;

a hollow pump rod which has said pump piston at one end, said cylinder fixed to its other end, and a communication passage communicating with said low-pressure chamber;

a low-pressure operating chamber which communicates with the communicating passage which said hollow pump rod has;

pumping means which sucks the fluid in said low-pressure chamber into said pump chamber when said piston moves in the contracting direction, and discharges the fluid in said pump chamber into said fluid chamber in said cylinder when said piston moves in the extending direction; and communicating means which allows communication between said communication passage of said hollow pump rod and said fluid chamber of said cylinder, when said piston reaches a predetermined position after being displaced in the extending direction.

According to the above described aspect of the present invention, the height of the vehicle is automatically maintained at a predetermined level because the communication passage of the hollow pump rod and the fluid chamber of the cylinder communicate with each other when the piston reaches a predetermined position by being displaced in the extending direction. Thus, driving stability and good riding comfort are realized.

BRIEF DESCRIPTION OF THE DRAWINGS

Other objects and further features of the present invention will become more apparent from the following detailed description when read in conjunction with the accompanying drawings, in which.

DESCRIPTION OF THE PREFERRED EMBODIMENTS

A description will now be given, with reference to FIGS. 1 through 4, of a hydropneumatic shock absorber of a first embodiment of the present invention.

A hydropneumatic shock absorber 10 of this embodiment is built, for example, in a suspension system for supporting the rear wheels of an automotive vehicle.

Figure 1:
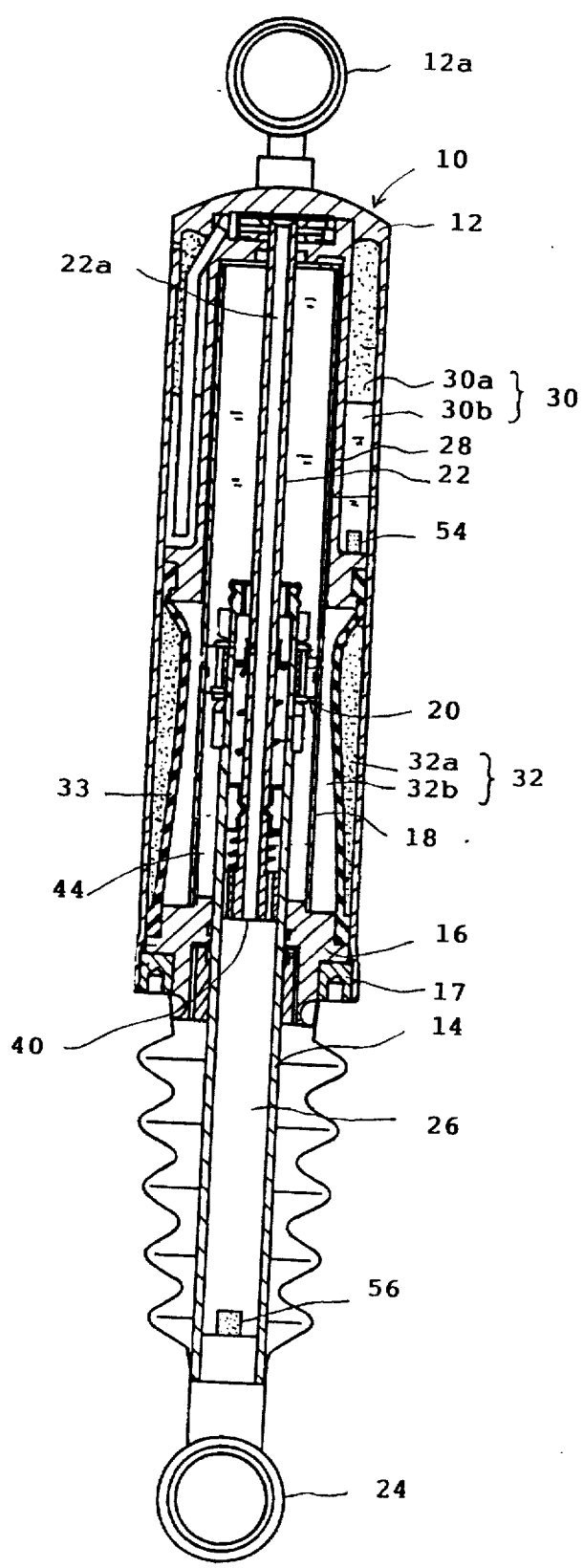
FIG. 1 is a cross sectional view of a hydropneumatic shock absorber of a first embodiment of the present invention.

As shown in FIG. 1, the hydropneumatic shock absorber 10 has a cylinder 12. The cylinder 12 functions as a casing of the hydropneumatic shock absorber 10. The top of the cylinder 12 is provided with a connecting part 12a connected to a vehicle body (not shown), and the bottom of the cylinder 12 is provided with a bearing member 16 which slidably guides a hollow piston rod 14 described later and an annular fixing member 17 which prevents the bearing member 16 from dropping.

An inner cylinder 18 is provided inside the cylinder 12. The inner cylinder 18 accommodates a piston 20 which slides along the inner wall of the inner cylinder 18, a hollow piston rod 14 having the piston 20 fixed at one end thereof, and a hollow pump rod 22 which penetrates the piston 20 inserted into the piston rod 14 from above.

A bottom opening of the hollow piston rod 14 is blocked by a connecting part 24 connected to an arm for supporting the wheel. As a result of this, a low-pressure chamber 26 is formed inside the hollow piston rod 14 and is filled with a fluid.

Figure 2:
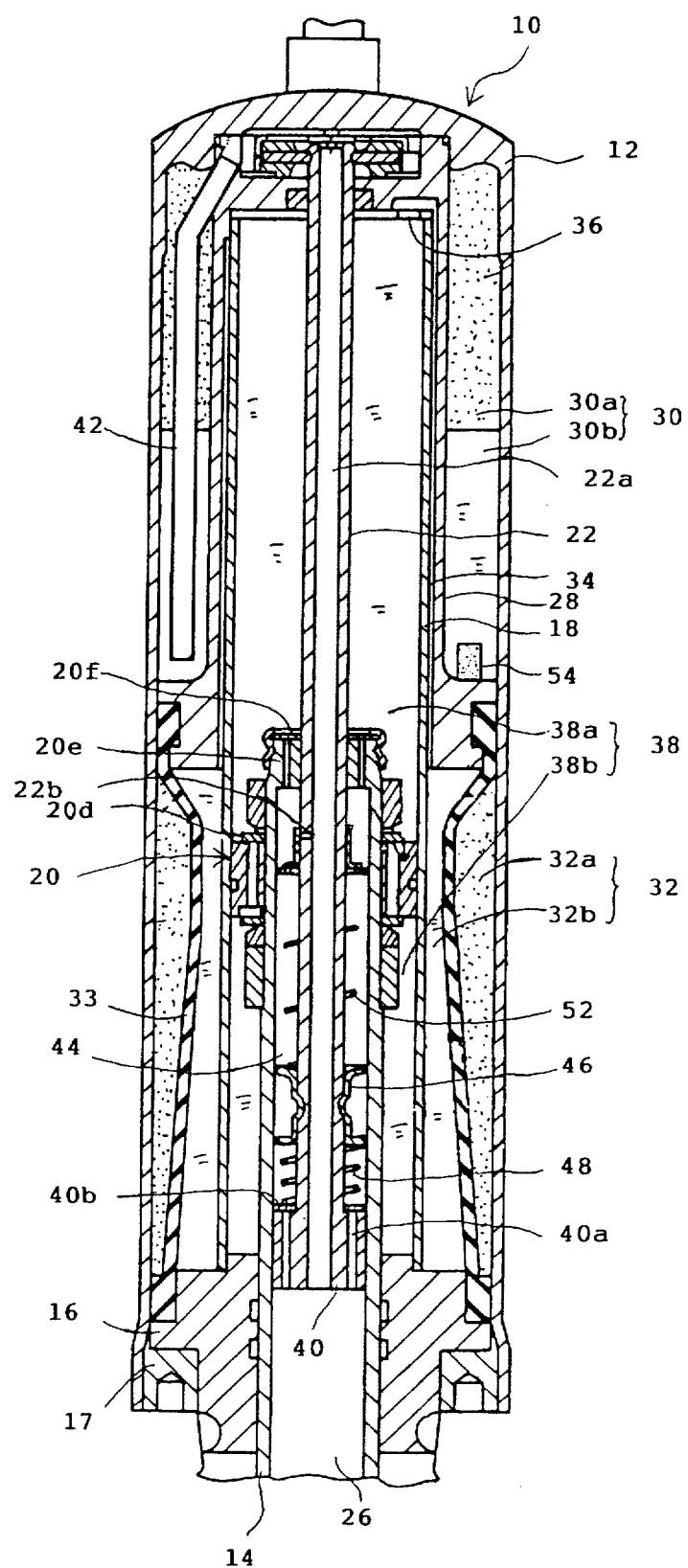
FIG. 2 is an enlarged cross sectional view of the interior of a cylinder.

As shown in FIG. 2, a cylindrical inner tube 28a is provided so that a low-pressure operating chamber 30 and a high-pressure operating chamber 32 are formed between the cylinder 12 and the inner cylinder 18. A fluid and a low-pressure gas such as a nitrogen gas fills the low-pressure operating chamber 30. In other words, a low-pressure gas chamber 30a and a low-pressure fluid chamber 30b are formed in the low-pressure operating chamber 30.

A cylindrical diaphragm 33 is provided inside the high-pressure operating chamber 32 so as to separate the interior of the high-pressure operating chamber into an inner room and an outer room. The outer room is filled with a high-pressure gas such as a nitrogen gas and the inner room is filled with a fluid. In other words, a high-pressure gas chamber 32a and a high-pressure fluid chamber 32b are formed in the high-pressure operating chamber 32.

A gap 34 is formed around the entire periphery of the inner cylinder 18 so as to separate the inner tube 28 and the inner cylinder 18. A through hole 36 for communicating the gap 34 with the interior of the inner cylinder 18 is provided at the top of the inner cylinder 18. The interior of the inner cylinder 18 is filled with a fluid and is referred to as a fluid chamber 38 hereinafter. The gap 34 and the through hole 36 function as a passage between the high-pressure chamber 32b and the fluid chamber 38. As a result, the pressure in the fluid chamber 38 is maintained to be equal to the pressure in the high-pressure fluid chamber 32b, that is the pressure of the high-pressure gas chamber 32a.

Figure 3:
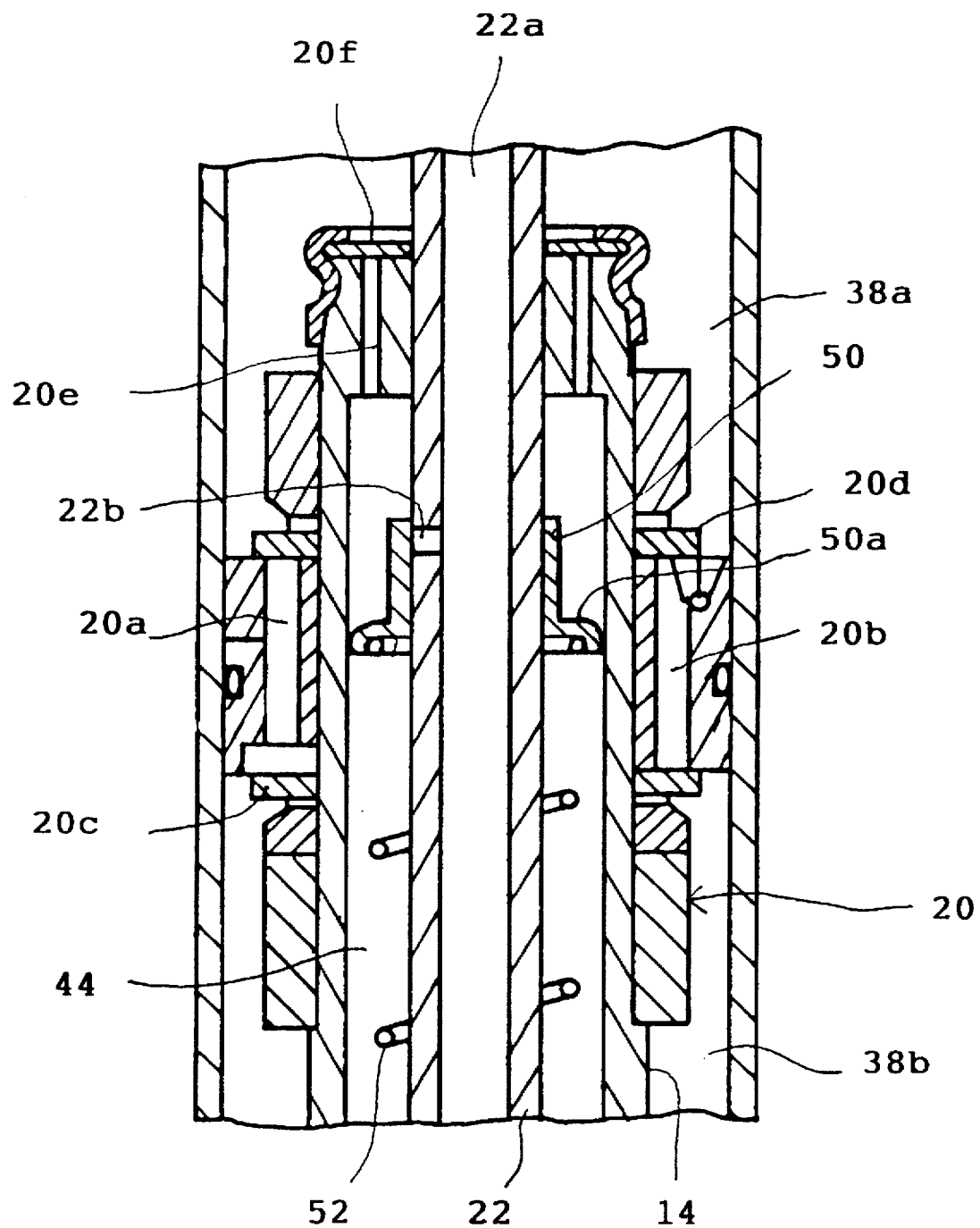
FIG. 3 is an enlarged cross sectional view of a communicating mechanism.
Figure 4:
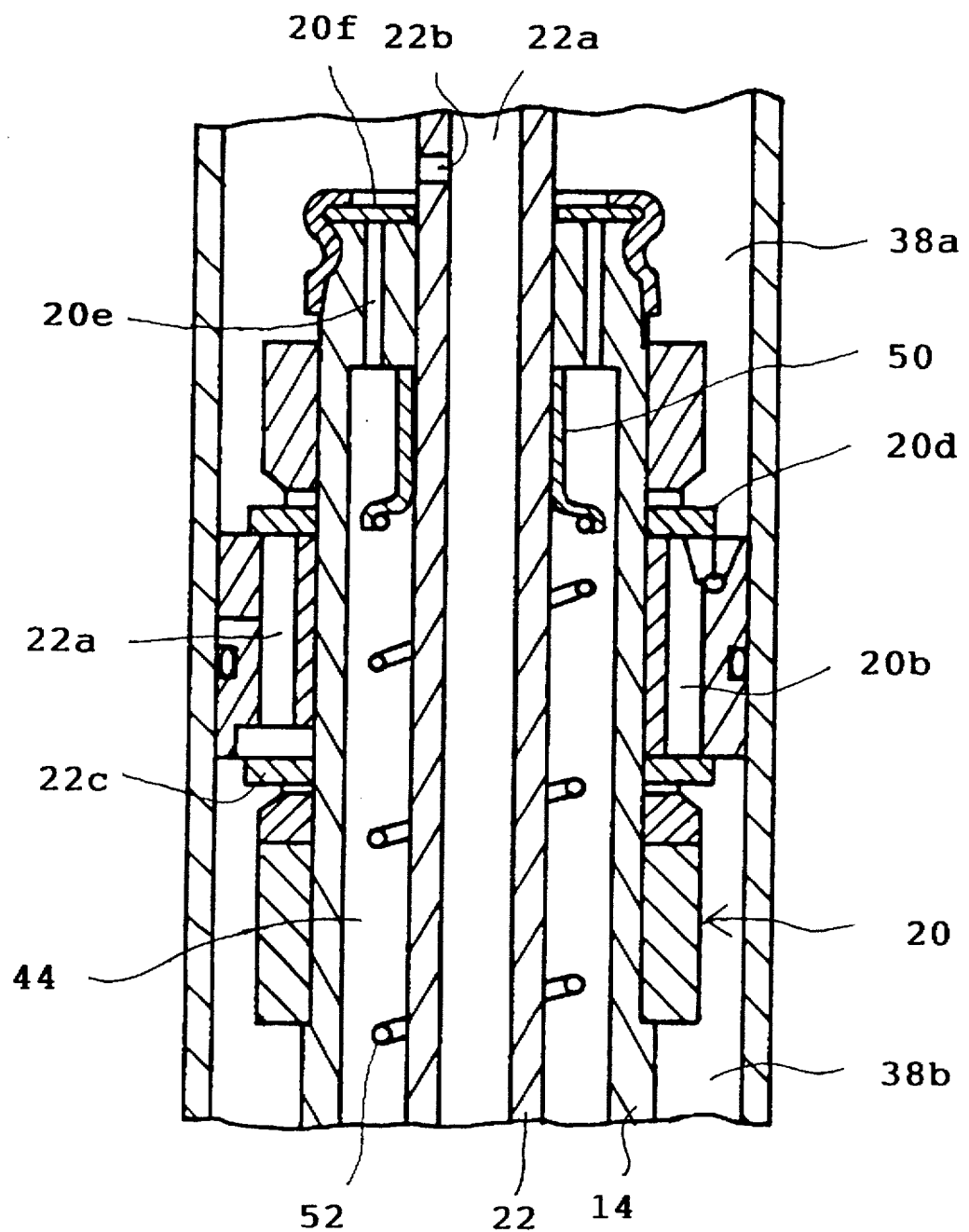
FIG. 4 is a cross sectional view explaining the sliding operation of a piston.

The fluid chamber 38 is separated into a upper chamber 38a and a lower chamber 38b by the piston 20. As shown in FIGS. 3 and 4, the piston 20 is provided with a small hole 20a for guiding the fluid in the lower chamber 38b to the upper chamber 38a when the piston 20 is lowered, and with a small hole 20b for guiding the fluid in the upper chamber 38a to the lower chamber 38b.

A leaf valve 20c for opening and closing the small hole 20b is provided on the underside of the piston 20, and a leaf valve 20d for opening and closing the small hole 20a is provided on the topside of the piston 20. When the piston 20 moves upward, the leaf valve 20c on the underside opens, and, when the piston moves downward, the leaf valve 20d on the topside opens, with the result that only the flow of the fluid as described above is allowed. When the piston 20 slides in the inner cylinder 18 due to an oscillation applied via the wheel (not shown), the fluid passes through the small hole 20a or the small hole 20b as a result of the sliding of the piston 20. Consequently, an appropriate damping force corresponding to the dimensions of the small holes 20a and 20b and the viscosity of the fluid is exerted.

As has been mentioned, the hollow pump rod 22 is inserted into the interior of the hollow piston rod 14. As shown in FIG. 2, the hollow pump rod 22 is a member which has, on one end thereof inserted into the hollow piston rod 14, a pump piston 40. The other end of the pump rod 22 is fixed beneath the top of the cylinder 11. The pump rod 22 has a longitudinal passage 22a inside.

The top of the passage 22a communicates with a pipe 42 inserted into the low-pressure fluid chamber 30b, and the bottom of the passage 22a opens into the low-pressure chamber 26 formed in the hollow piston rod 14. Therefore, the fluid in the low-pressure chamber 30b can flow into the low-pressure chamber 26 via the pipe 42 and the passage 22a.

The hollow piston rod 14, the piston 20, the hollow pump rod 22 and the pump piston 40 constitute a pumping mechanism, which is an essential part of the first embodiment. Specifically, a pump chamber 44 is formed between the hollow pump rod 22 and the hollow piston rod 14. The pump chamber 44 is expanded when the piston 20 is raised (moves in the contracting direction), and is compressed when the piston 20 is lowered (moves in the extending direction).

The pump piston 40 has a suction passage 40a which allows communication between the low-pressure chamber 26 and the pump chamber 44, and an inlet valve 40b which allows the flow of the fluid only in a direction from the low-pressure chamber 26 to the pump chamber 44. The top of the piston 20 is provided with a discharge passage 20e which allows communication between the pump chamber 44 and the upper chamber 38a, and an outlet valve 20f which allows the flow of the fluid only in a direction from the pump chamber 44 to the upper chamber 38a. When the piston 20 moves upward (in the contracting direction), only the inlet valve 40b opens as the pump chamber 44 is extended so that a suction process whereby the fluid in the low-pressure chamber 26 is sucked by the pump chamber 44 is executed. When the piston is lowered (in the extending direction), only the outlet valve 20f opens as the pump chamber 44 is compressed so that a discharge process whereby the fluid in the pump chamber 44 is discharged to the upper chamber 38a is executed.

As shown in FIG. 2, the inlet valve 40b is pressed toward the closing position by a coil spring 48 disposed between the lower end of a spring seat member 46 fixed to the hollow pump rod 22, and the pump piston 40. Thus, a pressure greater than the pressing force of the coil spring 48 is required in order to open the inlet valve 40b. In this way, a stable opening operation of the inlet valve 40b is realized.

A description will now be given of a mechanism (hereinafter, referred to as a communicating mechanism) which allows communication between the upper chamber 38a filled with the low-pressure fluid and the passage 22a in the hollow pump rod 22, when the piston 20 is lowered (moves in the extending direction) to a predetermined position.

As shown in FIG. 3, the hollow pump rod 22 is provided with a communicating hole 22b which allows communication between the passage 22a formed in the pump rod 22 and an external space. The hollow pump rod 22 has, on the periphery thereof, a valve 50 which slides along the hollow pump rod 20 when the piston moves in the extending direction, so as to open and close the communicating hole 22b.

Specifically, the valve 50 is maintained, by a coil spring 52 which rests on the spring seat member 46 (see FIG. 2), at a predetermined position so as to close the communicating hole 22b of the hollow pump rod 22.

When the piston 20 is displaced in the extending direction (lowered), the top of the valve 50 comes into contact with the piston 20. When the piston 20 is further displaced in the extending direction, the valve 50 is lowered against the pressing force of the coil spring 52 until, as shown in FIG. 4, the communicating hole 22b is located above the piston 20 and opens into the upper chamber 38a.

When the communicating hole 22b opens into the upper chamber 38a, the fluid filling the upper chamber 38a is returned to the low-pressure operating chamber 30 (see FIG. 2) via the communicating hole 22b and the passage 22a.

A flange 50a of the valve 50 and the spring seat member 46 are provided with notches or small holes for allowing the flow of the fluid. Thus, the fluid which flows into the pump chamber 44 is allowed to be discharged into the upper chamber 38a without being obstructed by the valve 50 and the spring seat member 46.

In this embodiment, as shown in FIG. 1, a permanent magnet 54 is fixed in the interior of the low-pressure operating chamber 30 formed in the cylinder 12, and a permanent magnet 56 is fixed in the interior of the low-pressure chamber 26 formed in the hollow piston rod 14.

The permanent magnets 54 and 56 are provided so as to attract metal foreign matter included in the fluid in the low-pressure fluid chamber 30b or in the low-pressure chamber 26. Such foreign matter includes metal powders created due to abrasion when the piston 20 slides.

The foreign matter included in the fluid is prevented by these magnets from being attached to the communicating hole 22b, the piston 20, the small holes 20a and 20b (see FIG. 3), the inlet valve 40b, the outlet valve 20f (see FIG. 2) or the like. In this way, a malfunction is prevented from occurring.

Use of both of the two permanent magnets 54 and 56 is not always necessary. One magnet alone can have a significant effect. Another type of attracting member such as a porous material configured to attract foreign matter included in the fluid may be provided instead of the permanent magnets 54 and 56.

A description will now be given of the operation of the hydropneumatic shock absorber of the above described description.

When a wheel moves up and down as a vehicle travels over an irregular road, oscillation is transmitted to the hollow piston rod 14 via the connecting part 24. As a result, the piston 20 provided on the top of the hollow piston rod 14 makes a reciprocating movement in the inner cylinder 18 in response to the up-and-down movement of the wheel.

When the piston 20 moves up, the fluid in the upper chamber 38a flows into the lower chamber 38b via the small hole 20b of the piston 20. When the piston moves down, the fluid in the lower chamber 38b flows into the upper chamber 38a via the small hole 20a. Viscosity resistance created by the small holes 20a and 20b provides resistance which damps the up-and-down movement of the wheel.

When the piston 20 moves up and down in response to the up-and-down movement of the wheel, a variation occurs in the ratio of the volume of the piston rod 14 and the piston 20 with respect to the volume of the inner cylinder 18 which houses the piston rod 14 and the piston 20. Such a variation in the volume ratio is canceled by the high-pressure gas chamber 32a formed by the diaphragm 33 performing the same function as an air spring.

A description will now be given of the leveling operation for maintaining the vehicle at a constant height.

When the piston moves upward (in the contracting direction), the pump piston 40 moves downward with respect to the hollow piston rod 14 (see FIG. 2) so that the volume of the pump chamber 44 is enlarged, the volume of the low-pressure chamber 26 is reduced, and the volume of the upper chamber 38a is reduced. As a result of this, a pressure which acts to open the inlet valve 40b and close the outlet valve 20f is created so that the fluid in the low-pressure chamber 26 flows into the pump chamber 44 via the suction passage 40a.

When the piston moves downward (in the extending direction), the pump piston moves upward so that the volume of the pump chamber 44 is reduced, the volume of the low-pressure chamber 26 is enlarged, and the volume of the upper chamber 38a is enlarged. As a result of this, a pressure which acts to open the inlet valve 40a and close the outlet valve 20f is created so that the fluid in the pump chamber 44 flows into the upper chamber 38a via the discharge passage 20e. Since the upper chamber 38a communicates with the high-pressure fluid chamber 32b via the gap 34, the flow of the fluid of the low-pressure chamber 26 into the upper chamber 38a increases the amount of fluid in the high-pressure fluid chamber 32b, resulting in the increase of the gas pressure in the high-pressure gas chamber 32a. The gas pressure in the high-pressure gas chamber 32a functions to absorb the shock transmitted from the wheel.

When the number of passengers or the weight of the luggage increases in a vehicle in which the hydropneumatic shock absorber 10 is mounted, a compressing force exerted between the hollow piston rod 14 and the cylinder 12 increases, resulting in a relative upward movement of the piston 20 and a relative downward movement of the pump piston 40. Consequently, the vehicle height is reduced.

When the oscillation accompanying the travelling of the vehicle causes the above described pumping action to be repeated, the fluid in the low-pressure chamber 26 is gradually supplied to the upper chamber 38a so that the pressure in the high-pressure gas chamber 32a gradually increases.

When the gas pressure in the high-pressure gas chamber 32a increases, the pressure in the inner cylinder 18 increases so that the piston 20 moves in the extending direction due to a difference between an area to which the pressure of the upper chamber 38a is applied and an area to which the pressure of the lower chamber 38b is applied. Accordingly, the decrease in the vehicle height created in response to the increase in the vehicle weight or the like is canceled as the vehicle is traveling.

When the piston 20 continues to move in the extending direction as the vehicle is traveling, or when the piston 20 moves significantly in the extending direction due to a decrease in the number of passengers or the weight of the luggage, the communicating hole 22b moves to a position above the piston 20, as shown in FIG. 4. The fluid in the upper chamber 38a is returned to the low-pressure fluid chamber 38b (see FIG. 2) via the communicating hole 22b and the communicating passage 22a in the hollow pump rod 22. As a result, the pressure in the inner cylinder 18 is lowered, and the vehicle is maintained at a constant height.

Thus, according to the hydropneumatic shock absorber 10 of this embodiment, the vehicle is maintained at a constant height, irrespective of the number of passengers or the weight of the luggage. Hence, the shock applied upward from the road to the wheel, and the shock applied downward from the load of the vehicle to the wheel can be properly absorbed, thus ensuring that satisfactory riding comfort is realized.

It will be noted that the mechanism for maintaining the vehicle at a constant height is realized by a simple construction comprising the communicating hole 22a and the valve 50. In this respect, the hydropneumatic shock absorber 10 of this embodiment has an additional effect of reducing the size and cost of the shock absorber unit.

The hydropneumatic shock absorber 10 of this embodiment is configured such that the fluid in the pump chamber 44 is discharged into the upper chamber 38a in a process in which the piston 20 moves in the extending direction. For this reason, even if the wheel bounces (the piston moves in the contracting direction) as the vehicle travels over an irregular road, the fluid in the low-pressure chamber 26 is not transported to the upper chamber 38a.

Therefore, in the hydropneumatic shock absorber 10, no increase occurs in the damping force applied to the piston when the wheel bounces (is jolted upward), and the shock applied upward from the road to the wheel as well as the shock applied downward from the load of the vehicle to the wheel are properly absorbed. Hence, satisfactory riding comfort is realized.

Figure 5:
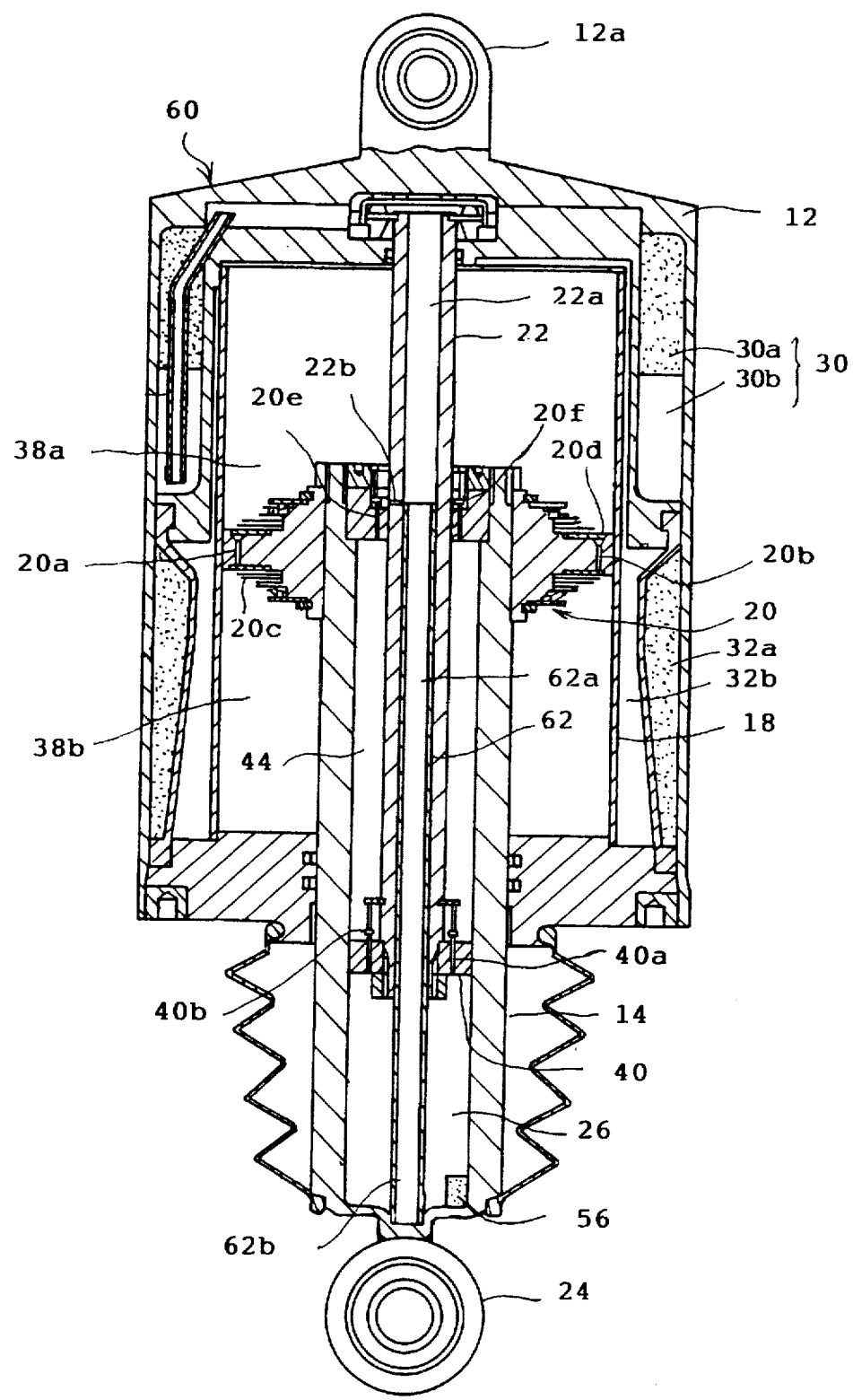
FIG. 5 is a cross sectional view of a hydropneumatic shock absorber of a second embodiment of the present invention.
Figure 6:
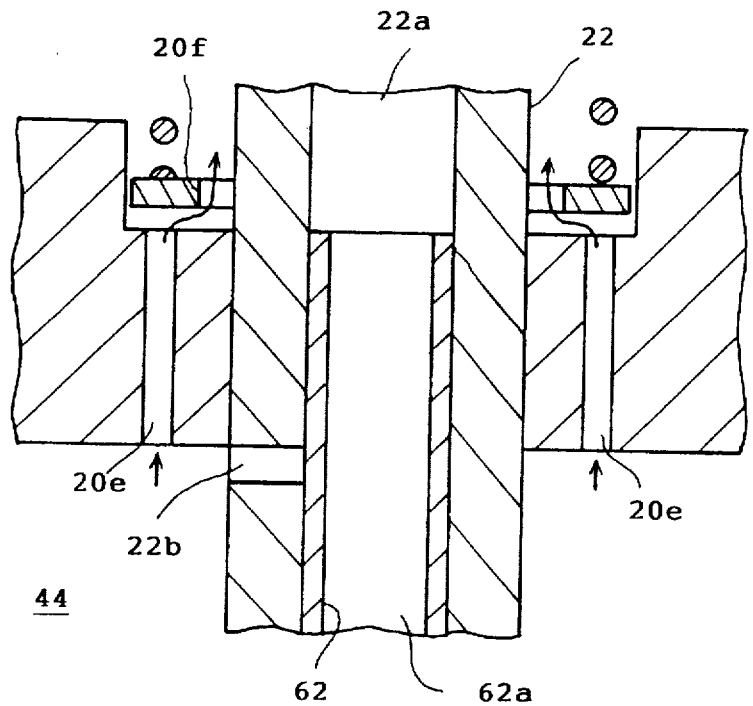
FIG. 6 is an enlarged cross sectional view showing an essential part of the second embodiment.
Figure 7:
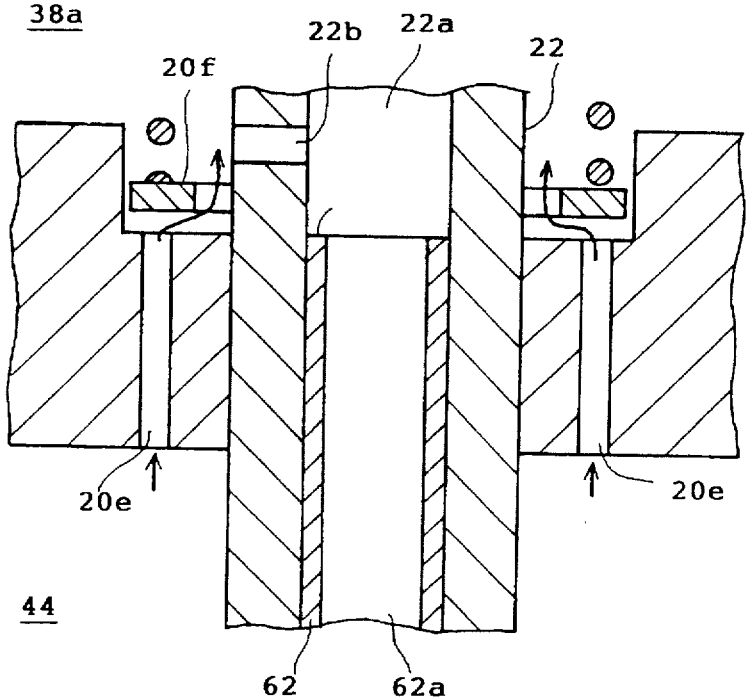
FIG. 7 is a cross sectional view explaining the operation of the communicating mechanism of the second embodiment.

FIGS. 5 through 7 show a second embodiment of the present invention. Those parts that are the same as the parts of FIGS. 1 through 4 are designated by the same reference numerals, and the description thereof is omitted.

A hydropneumatic shock absorber 60 shown in FIG. 5 has the same construction as that of the first embodiment and is characterized in that the mechanism for allowing communication between the upper chamber 38a of the inner cylinder 18 and the passage 22a in the hollow pump rod 22 comprises the communicating hole 22b provided in the hollow pump rod 22 and a communicating tube 62 inserted into the hollow pump rod 22.

The communicating tube 62 is a tube member having one end thereof inserted into the hollow pump rod 22 and having the other end thereof fixed to the lower end of the hollow piston rod 14. The communicating tube 62 has a passage 62a inside. The hollow piston rod 14 is provided with a depression which the lower end of the communicating tube 62 is engaged with. The communicating tube 62 is firmly secured to the lower end of the hollow piston rod 14 by solder etc., after being engaged with the depression and positioned at the center of the lower end of the hollow piston rod 14. The communicating tube can smoothly slide in the passage 22a of the hollow pump rod 22 when the piston slides. The sliding action of the piston 20 is not obstructed by the communicating tube 62.

A small hole 62b is provided adjacent to the lower end of the communicating tube 62. The passage 62a of the communicating tube 62 communicates with the low-pressure chamber 26 via the small hole 62b. Therefore, the level of the pressure of the low-pressure chamber 26 of the hydropneumatic shock absorber 60 is maintained at the level of the pressure of the low-pressure gas chamber 30a, similarly to the case of the hydropneumatic shock absorber 10.

According to the construction described above, the communicating hole 22b of the hollow pump rod 22 is opened and closed by the upper end of the communicating tube 62, which slides in the passage 22a, as the piston moves in the extending direction or in the contracting direction. That is, the communicating tube 62 is provided as a valve for opening and closing the communicating hole 22b of the passage 22a.

If the communicating tube 62 blocks the communicating hole 22b, as shown in FIG. 6, when the piston moves in the extending direction, the fluid in the pump chamber 44 is prevented from flowing into the passage 22a, and is discharged into the upper chamber 38a.

As shown in FIG. 7, when the piston 20 moves in the extending direction until it reaches a predetermined position, the communicating hole 22b moves above the upper end of the communicating tube 62 and above the outlet valve 20f, thus causing the flow of the fluid in the upper chamber 38a into the passage 22a of the hollow pump rod 22.

In this embodiment, the dimensions of the parts are set such that, when the upper end of the communicating tube 62 and the outlet valve 22f provided on the topside of the piston 20 are at the same level, the communicating hole 22b is located above the upper end of the communicating tube 62 and the outlet valve 22f.

When the number of passengers or the weight of the luggage decreases in a vehicle in which the hydropneumatic shock absorber 60 is mounted, the piston is lowered due to a difference between an area to which the pressure of the upper chamber 38a is applied and an area to which the pressure of the lower chamber 38b is applied.

When the piston 20 is lowered, the communicating tube 62 provided to be integral with the hollow piston rod 14 is lowered in the passage 22a until the communicating hole 22b opens into the upper chamber 38a. As a result, the passage 22a having a pressure equal to that of the low-pressure fluid chamber 30b communicates with the upper chamber 38a having a pressure equal to that of the high-pressure fluid chamber 32b. Consequently, the pressure of the upper chamber 38a, that is, the pressure of the high-pressure fluid chamber 32b, decreases.

Thereafter, due to the pumping action caused by the oscillation of the vehicle being driven, the fluid supplied from the low-pressure chamber 26 to the upper chamber 38a is returned to the low-pressure fluid chamber 30b so that the vehicle is maintained at a constant height. Therefore, the shock applied upward from the road to the wheel as well as the shock applied downward from the load of the vehicle to the wheel are properly absorbed. Hence, satisfactory riding comfort is realized.

In this embodiment, it is not necessary to provide the valve 50 and the coil spring 48 in the narrow pump chamber 44. Therefore, ease of assembling is increased, and the number of components is reduced. In addition, since the resistance in the pump chamber 44 is reduced, the pumping action becomes more efficient.

Figure 8:
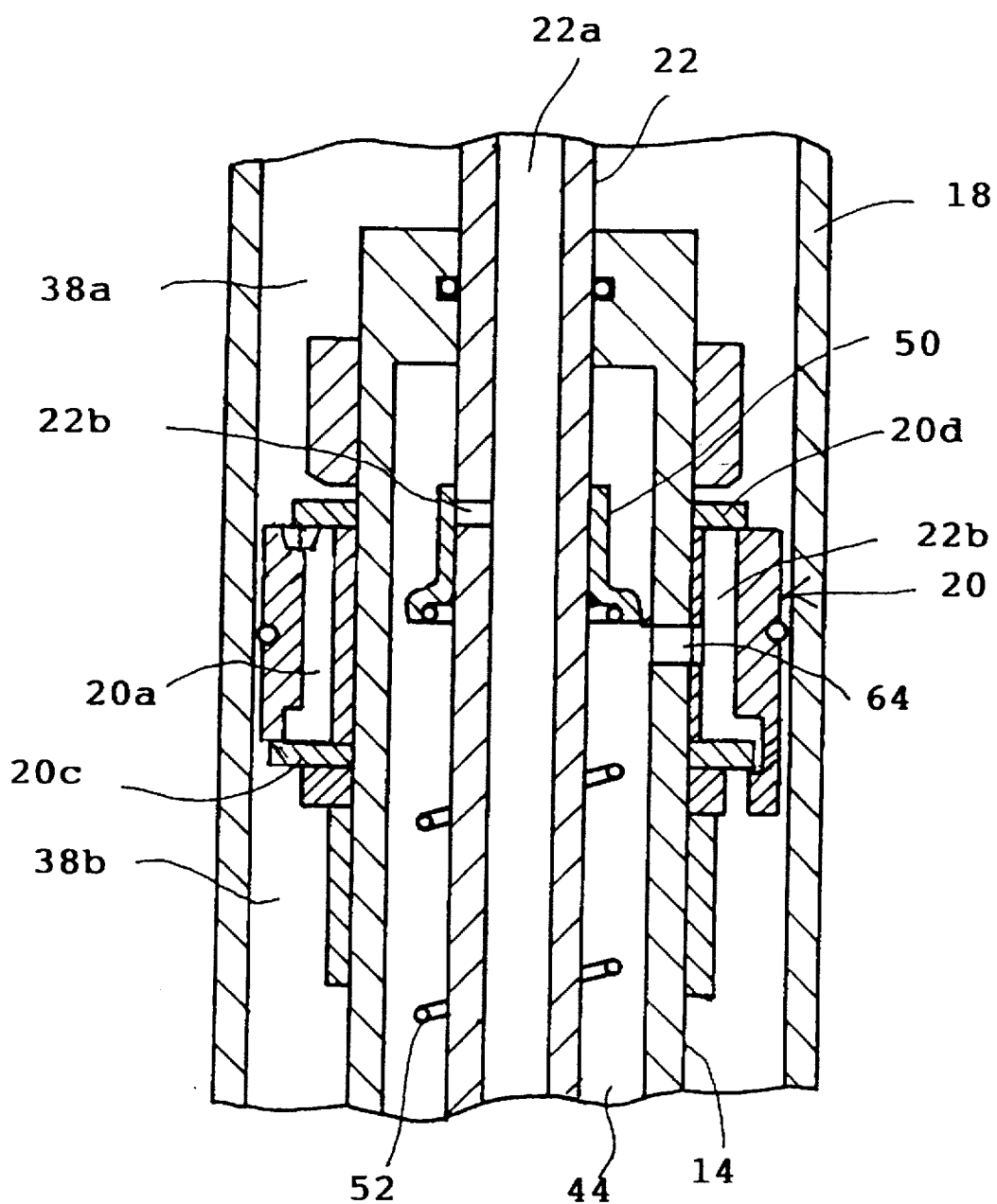
FIG. 8 is an enlarged cross sectional view showing an essential part of a hydropneumatic shock absorber of a third embodiment of the present invention.

FIG. 8 shows a third embodiment of the present invention. In FIG. 8, those parts that are the same as the parts of FIGS. 1 through 4 are designated by the same reference numerals, and the description there of is omitted.

Referring to FIG. 8, a discharge hole 64 which communicates with the small hole 20b of the piston 20 is provided to extend in a radial direction. The leaf valve 20c provided on the underside of the piston 20 is constructed to allow the fluid to flow only in the direction from the lower chamber 38b to the upper chamber 38a at the level of the small hole 20b.

Accordingly, when the piston 20 slides in the extending direction due to the pumping action described earlier, the fluid in the pump chamber 44 passes through the discharge hole 64 to reach the small hole 20b, and is then discharged into the upper chamber 38a by opening the leaf valve 20d. The fluid in the lower chamber 38b flows into the upper chamber 38a via the small hole 20b by opening the leaf valve 20c.

A unit consisting of the small hole 20b of the piston 20 and the leaf valve 20d provided on the topside of the piston 20 functions as a unit for generating a damping force, and also functions as an outlet valve of the pump part.

Therefore, the third embodiment includes all the features of the previously disclosed embodiments, except it is not necessary to provide, at the upper end of the hollow piston rod 14, parts corresponding to the discharge passage 20e and the outlet valve 20f of the hydropneumatic shock absorber 10 of the first embodiment. Accordingly, the total length of the hollow piston rod 14 is shorter, the number of components is reduced, and the efficiency of the assembling work is improved as compared with those of the conventional technology.

Figure 9:
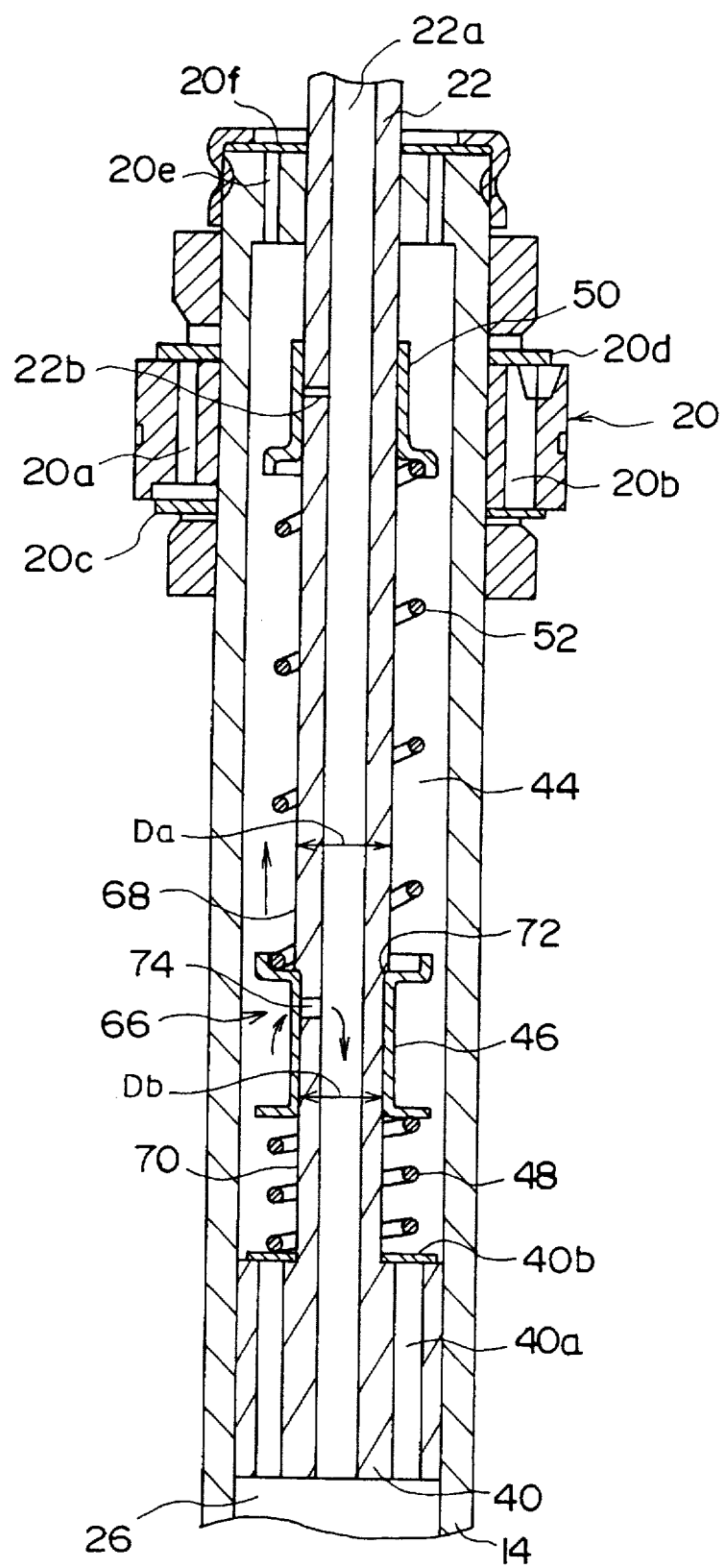
FIG. 9 is an enlarged cross sectional view showing an essential part of a hydropneumatic shock absorber of a fourth embodiment of the present invention.

FIG. 9 shows a fourth embodiment of the present invention. In FIG. 9, those parts that are the same as the parts of FIGS. 1 through 4 are designated by the same reference numerals, and the description thereof is omitted.

The fourth embodiment shown in FIG. 9 is characterized in that there is provided a discharge amount adjusting mechanism 66 which reduces the rate at which the fluid is discharged while the piston travels in the extending direction after the piston 20 is adjusted to be located at a position at which the predetermined vehicle height is realized.

The discharge amount adjusting mechanism 66 is constructed to allow communication between the pump chamber 44 and the passage 22a in the discharge process in which the piston 20 slides in the extending direction so as to return the fluid in the pump chamber 44 to the low-pressure chamber 26.

The hollow pump rod 22 has a large-diameter part 68 which the valve 50 is slidably engaged with and a small-diameter part 70 which the spring seat member 46 is slidably engaged with. The large-diameter part 68 has a diameter Da, and the small-diameter part 70 has a diameter Db, where Da>Db. The spring seat member 46 is fitted to a step part 72 formed at the boundary between the large-diameter part 68 and the small-diameter part 70.

A small hole 74 which communicates with the passage 22a is provided in the small-diameter part 70 so as to extend radially. The small hole 74 is opened and closed as the spring seat member 46 slides along the small-diameter part 70. That is, in this embodiment, the spring seat member 46 serves as a valve to open and close the small-hole part 70.

The spring seat member 46 is pressed upward by the coil spring 48 for pressing the inlet valve 40b in the closing direction, and is pressed downward by the coil spring 52 for pressing the valve 50 upward.

The dimensions of the coil springs 48 and 52 are set such that the spring seat member 46 is pressed by the step part 72 when the upper end of the hollow piston rod 14 is removed from the valve 50. In this condition, the small hole 74 is blocked so that, when the piston 20 moves in the extending direction so as to reduce the volume of the pump chamber 44, a reduced volume of fluid is discharged from the pump 44 to the upper chamber 38a.

Figure 10:
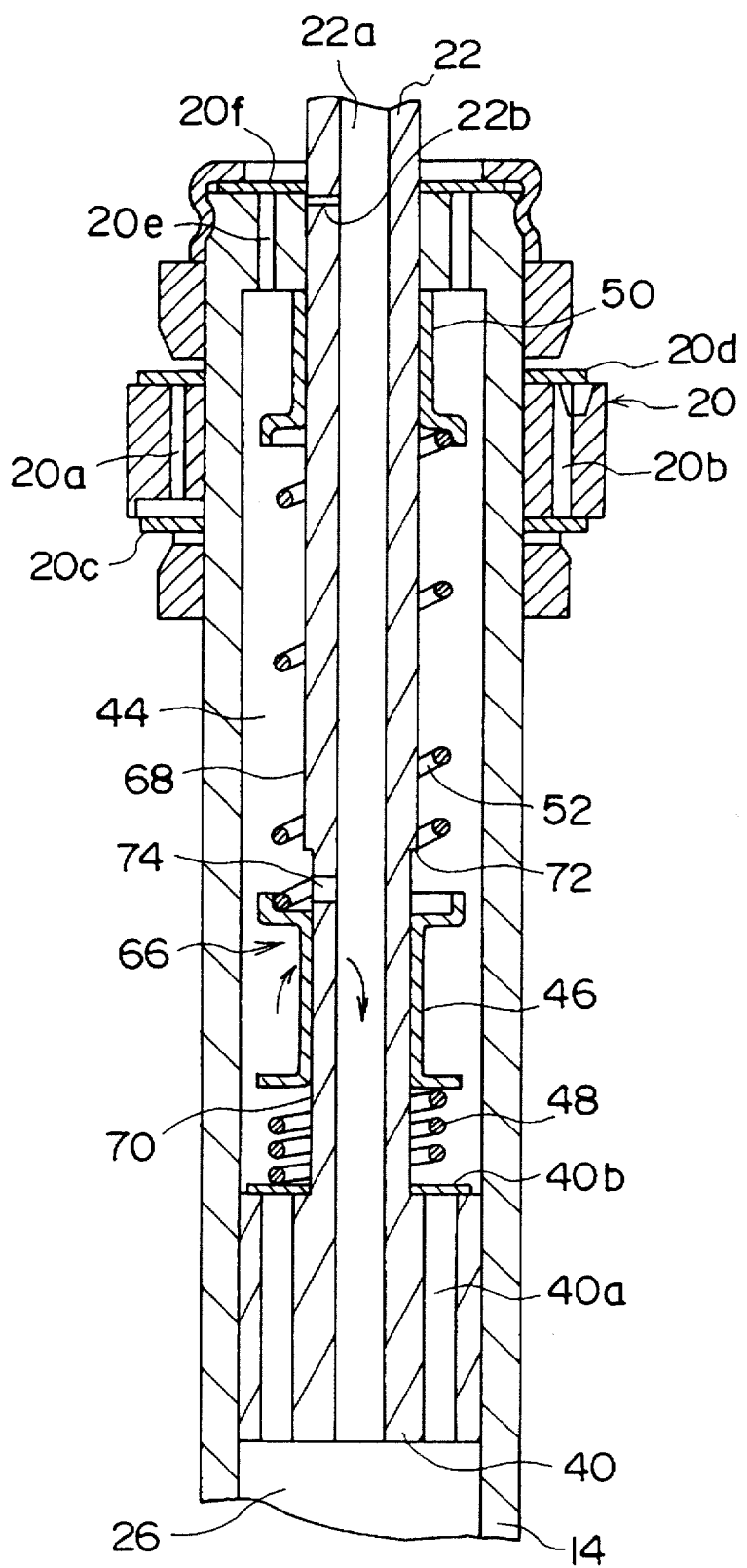
FIG. 10 is a cross sectional view explaining the operation of the fourth embodiment.

FIG. 10 shows a condition in which the valve 50 is pressed downward by the underside of the upper end of the piston rod 14 until the communicating hole 22b is located adjacent to the upper end of the piston 20.

In the condition shown in FIG. 10, the distance between the valve 50 and the inlet valve 40b is smaller than the corresponding distance that exists in the condition shown in FIG. 9. The pressing force exerted by the coil spring 52 on the spring seat member 46 becomes greater as the distance between the valve 50 and the inlet valve 40b becomes smaller. As the valve 50 gets nearer to the inlet valve 40b, the spring seat member 46 is displaced toward the inlet valve 40b.

In this embodiment, the dimensions of the coil springs 48 and 52 are set such that the spring seat member 46 retracts so as to open the small hole 74 when the communicating hole 22b is open adjacent to the upper end of the piston 20 as shown in FIG. 10.

Thus, in the fluid discharge process in which the piston 20 moves in the extending direction, and which occurs once the condition shown in FIG. 10 is created as a result of the adjustment of the height of the car, the fluid in the upper chamber 38a is returned to the low-pressure chamber 26 via the communicating hole 22b, and the fluid in the pump chamber 44 is returned to the low-pressure chamber 26 via the small hole 74.

In a construction where the vehicle height adjustment is performed by using only the communicating hole 22b, each time the piston 20 moves in the extending direction, the fluid is returned from the upper chamber 38a to the low-pressure 26 after being discharged from the pump chamber 44 to the upper chamber 38a. Therefore, an unnecessary load is applied to the hollow piston rod 14.

In contrast, this embodiment is configured such that the vehicle height is adjusted by using the communicating hole 22b and the small hole 74. In the discharge process in which the piston 20 moves in the extending direction, a part of the fluid is returned from the pump chamber 44 to the low-pressure 26. Thus, the load applied on the piston rod 14 is lessened, and the action of the wheel in the extending direction, that is, the rebounding action, becomes more smooth, thus improving riding comfort.

Figure 11:
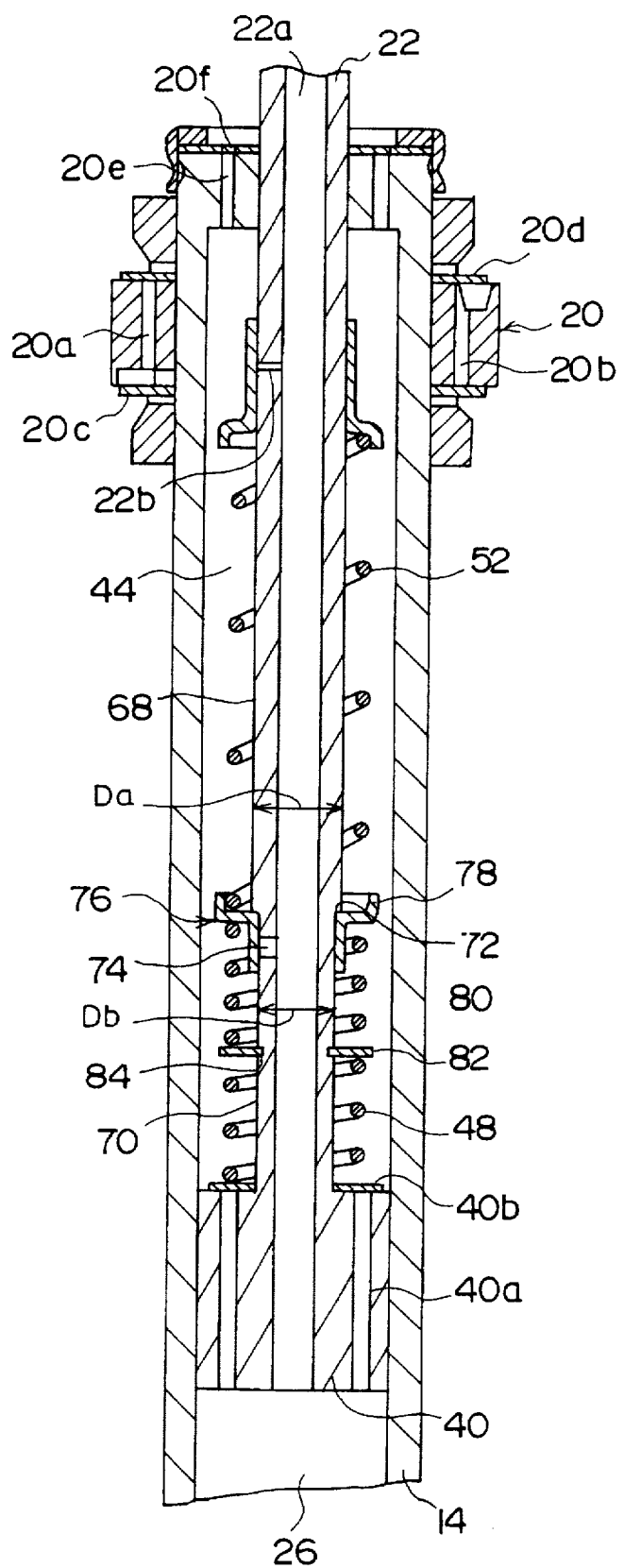
FIG. 11 is cross sectional view of an essential part of a hydropneumatic shock absorber of a fifth embodiment of the present invention.

FIG. 11 shows a fifth embodiment of the present invention. In the figure, those parts that are the same as the parts of the fourth embodiment shown in FIGS. 9 and 10 are given the same reference numerals, and the description thereof is omitted.

In the fifth embodiment shown in FIG. 11, there is provided a discharge amount adjusting mechanism 76 for decreasing the rate at which the fluid is discharged while the piston 20 moves in the extending direction after the piston 20 is adjusted to be located at a position at which the predetermined vehicle height is realized. Specifically, the fifth embodiment is characterized in that the discharge amount adjusting mechanism 76 is operable without affecting the pressure for opening the inlet valve 40b.

As shown in FIG. 11, a spring seat member 78 is fitted on the step part 72 of the hollow pump rod 20. The small hole 74 which communicates with the passage 22a is provided in the small diameter part 70 below the step part 72 so as to extend radially. The small hole 74 is opened and closed by the spring seat member 78 which functions as a valve capable of opening and closing the small diameter part 70.

The spring seat member 78 is pressed upward by a coil spring 80 which is separate from the coil spring 48 for pressing the inlet valve 40b in the closing direction, and is pressed downward by the coil spring 52 for pressing the valve 50. A spring engagement member 82 is disposed between the coil springs 48 and 80. The spring engagement member 82 has an annular shape and the innermost part of the spring engagement member 82 is engaged with a groove 84 provided in the small diameter part 70.

The coils 48 and 80 are provided so that the action of one of them does not affect that of the other. Specifically, the coils 48 and 80 are engaged with the underside and the topside, respectively, of the spring engagement member 82 which is engaged with the groove 84. Thus, the inlet valve 40b receives only the spring force of the coil spring 48 and is not affected by the variation of the spring force of the coil spring 80 in response to the sliding action of the spring seat member 78. Accordingly, the inlet valve 40b can be opened and closed in a stable manner irrespective of the sliding action of the spring seat member 78.

Figure 12:
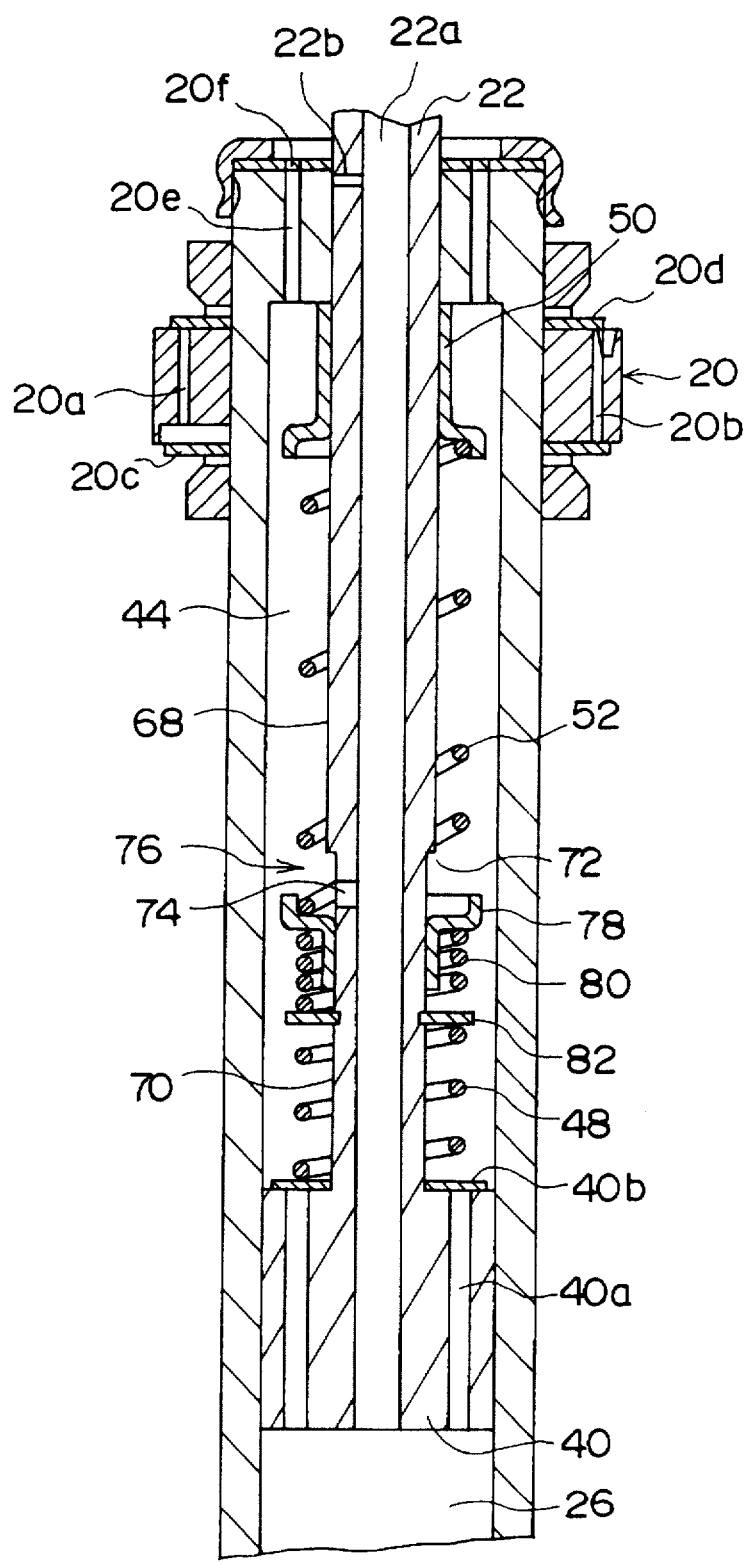
FIG. 12 is a cross sectional view explaining the operation of the fifth embodiment.

FIG. 12 shows a condition where the valve 50 is moved downward by being pressed by the underside of the upper end of the piston rod 14 as a result of the vehicle height adjustment by the hydropneumatic shock absorber having the discharge amount adjusting mechanism 76 of the above construction, until the communication hole 22b is located adjacent to the upper end of the piston 20.

In this embodiment, the dimensions of the coil springs 52 and 80 are set such that the spring seat member 78 retracts so as to open the small hole 74 when the communicating hole 22b is open adjacent to the upper end of the piston 20, as shown in FIG. 12.

Thus, in the fluid discharge process in which the piston 20 moves in the extending direction, and which occurs once the condition shown in FIG. 12 is created as a result of the adjustment of the height of the car, a part of the fluid is directly returned from the pump chamber 44 to the low-pressure chamber 26. Thus, the load applied on the hollow piston rod 14 is lessened, and the action of the wheel in the extending direction, that is, the rebounding action, becomes more smooth, thus improving riding comfort.

Figure 13:
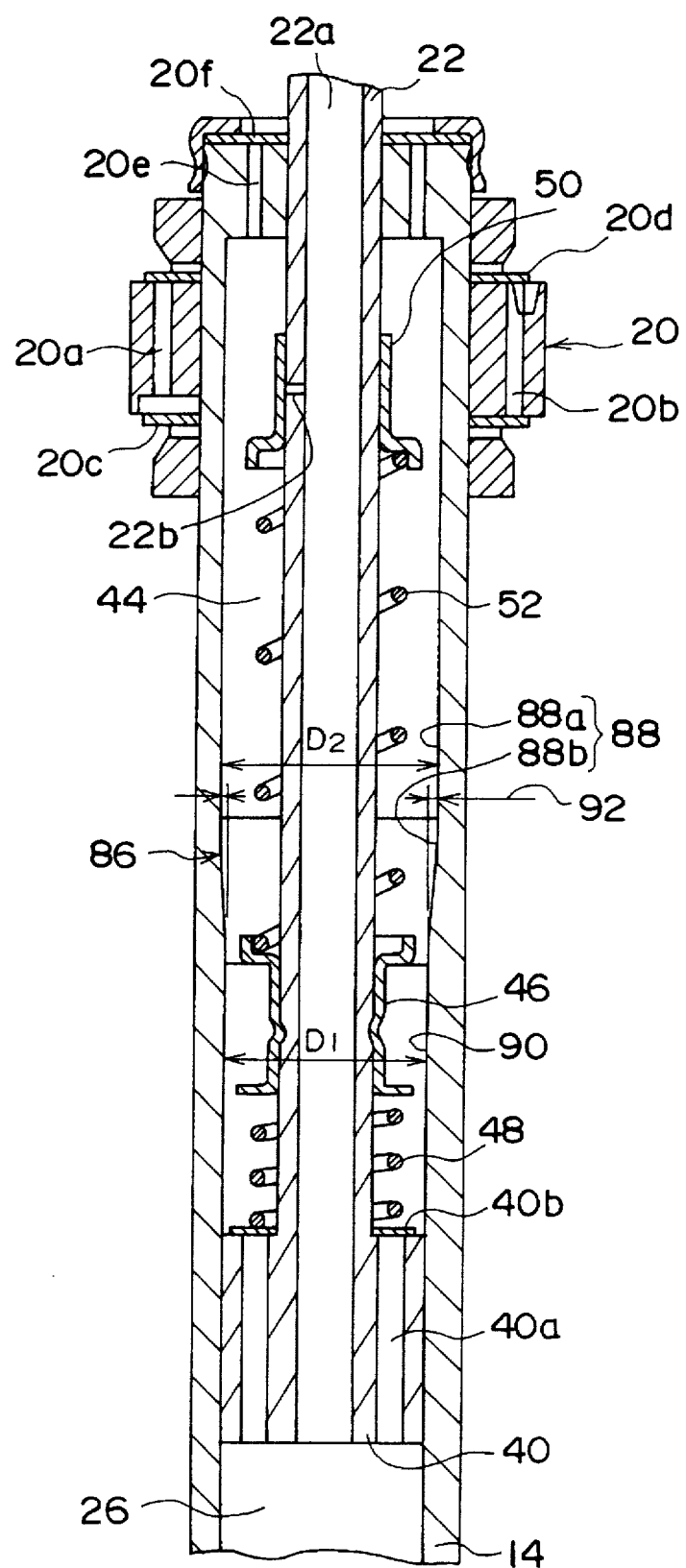
FIG. 13 is a cross sectional view of an essential part of a hydropneumatic shock absorber of a sixth embodiment of the present invention.

FIG. 13 shows a sixth embodiment of the present invention. In the figure, those parts that are the same as the parts of the first embodiment shown in FIGS. 1 through 4 are designated by the same reference numerals, and the description thereof is omitted.

The embodiment shown in FIG. 13 has a discharge amount adjusting mechanism 86 for reducing the rate at which the fluid is discharged while the piston 20 moves in the extending direction after the piston 20 is adjusted to be located at a position at which the predetermined vehicle height is realized. The sixth embodiment is characterized in that the discharge amount adjusting mechanism 86 comprises an enlarged-diameter part as provided in the inner wall of the hollow piston rod 14.

In the inner wall of the hollow piston rod 14, there are provided an engagement part 90 (inner diameter $D_1$) which the pump piston 40 is engaged with, an engagement part 88a (inner diameter $D_2$) which has a larger diameter than the pump piston 40 and which the pump piston 40 is engaged with, and a tapered part 88b formed between the engagement parts 90 and 88a.

In this embodiment, the engagement part 88a and the tapered part 88b form the enlarged-diameter part 88. However, the tapered part 88b may be omitted so that only the engagement part 88a forms the enlarged-diameter part 88.

The engagement part 90, the engagement part 88a and the tapered part 88b are disposed such that the lower end of the pump piston 40 is located at the lower end of the engagement part 88a when the vehicle height is adjusted to a predetermined dimension.

When the piston 20 moves in the extending direction, the lower end of the pump piston 40 approaches the end of the enlarged-diameter part 88 in the process in which the piston 20 comes to a predetermined position, and a gap 92 is created between the periphery of the pump piston 40 and the enlarged-diameter part 88. The gap 92 is enlarged as the pump piston 40 moves up and down.

When the piston 20 is displaced in the extending direction after the piston 20 has already moved near to a position at which the predetermined vehicle height is achieved, the lower end of the pump piston 40 approaches near to the lower end of the enlarged-diameter part 88 during the discharge process. Thereafter, a part of the fluid in the pump chamber 44 is returned to the low-pressure chamber 26 via the gap 92.

The amount of the fluid flowing from the pump chamber 44 to the low-pressure chamber 26 varies gradually in response to the variation of the size of the gap 92, which variation occurs as the pump piston 40 passes the tapered part 88b. Therefore, the amount of fluid returned from the pump chamber 44 to the low-pressure chamber 26 does not abruptly increase, and the flow of fluid returned from the pump chamber 44 to the low-pressure chamber 26 is not stopped abruptly. Thus, an abrupt impact by oil is prevented.

Figure 14:
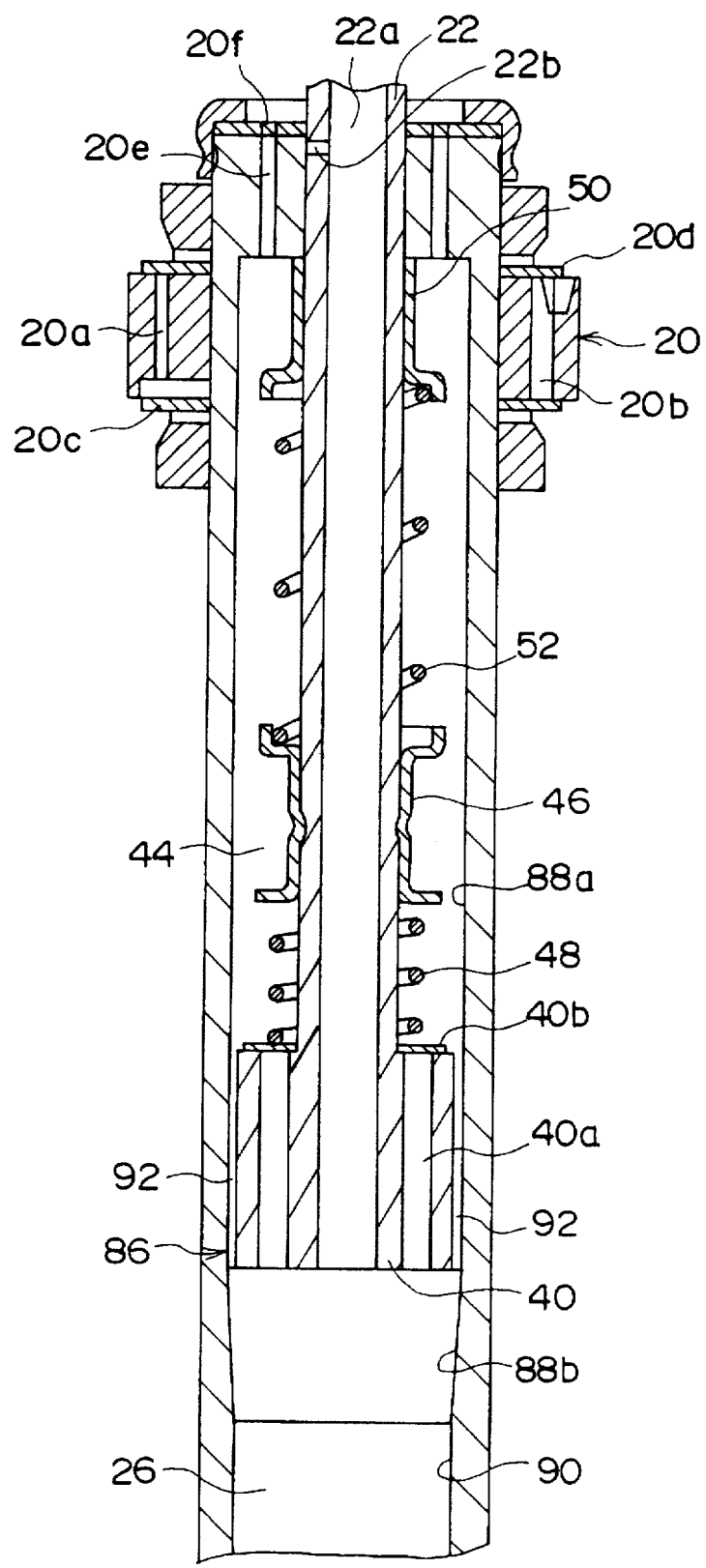
FIG. 14 is a cross sectional view of the operation of the sixth embodiment.

FIG. 14 shows a condition in which the valve 50 is moved downward by being pressed by the underside of the upper end of the piston rod 14 as a result of the vehicle height adjustment by the hydropneumatic shock absorber having the discharge adjustment mechanism 86 of the above construction, until the communication hole 22b becomes adjacent to the upper end of the piston 20.

In this embodiment, the dimensions of the parts are set such that the lower end of the pump piston 40 reaches the lower end of the engagement part 88a in a condition where the communication hole 22b is opened above the piston 20 as shown in FIG. 14.

When the condition as shown in FIG. 14 is created as a result of the vehicle height adjustment, a part of the fluid is directly returned from the pump chamber 44 to the low-pressure chamber 26 via the gap 92 in the discharge process in which the piston 20 moves in the extending direction. Thus, the rebounding action of the wheel becomes more smooth, and riding comfort is improved.

While an automobile has been used as an example in the above described embodiments, the embodiments can also be applied to other vehicles.

The present invention is not limited to the aforementioned embodiments, and variations and modifications may be made without departing from the scope of the present invention.

What is claimed is:

1. A hydropneumatic shock absorber comprising:
   a cylinder having a fluid chamber filled with fluid;
   a high-pressure operating chamber which communicates with said fluid chamber;
   a piston slidably provided in said fluid chamber in said cylinder;
   a hollow piston rod having said piston at one end and being filled with the fluid;
   a pump piston which, slidably provided in said hollow piston rod, partitions a space in said hollow piston rod into a pump chamber formed near said piston and a low-pressure chamber formed opposite said piston;
   a hollow pump rod which has said pump piston at one end, said cylinder fixed to its other end, and a communication passage communicating with said low-pressure chamber;
   a low-pressure operating chamber which communicates with the communicating passage which said hollow pump rod has;
   an inlet valve which opens so as to allow the fluid in said low-pressure chamber to be sucked by said pump chamber when said piston moves in a contracting direction; and
   an outlet valve which opens so as to allow the fluid in said pump chamber to be discharged into said fluid chamber in said cylinder.

2. The hydropneumatic shock absorber as claimed in claim 1, wherein
   said piston includes damping force generating passages which communicate with rooms on both sides of said piston, and a damping force generating mechanism which communicates said damping force generating passage with said fluid chamber while said piston moves in an extending direction, and
   said outlet valve includes said damping force generating passage, said damping force generating mechanism, and a discharge hole which allows communication between said pump chamber and said damping force generating passage.

3. The hydropneumatic shock absorber as claimed in claim 2, wherein said communicating means comprises:
   a communicating hole provided in said hollow pump rod so as to allow communication between said communication passage of said hollow pump rod and an external space of said hollow pump rod; and a valve which slides along said hollow pump rod in response to said piston moving in an extending/contracting direction so as to open said communicating hole when said piston arrives at a predetermined position by being displaced in the extending direction.

4. The hydropneumatic shock absorber as claimed in claim 2, wherein said communicating means comprises:

a communicating hole provided in said hollow pump rod so as to allow communication between said communication passage of said hollow pump rod and an external space of said hollow pump rod; and a hollow communicating tube having one end thereof slidably inserted into said communicating passage of said hollow pump rod and having its other end fixed to said hollow piston rod so as to communicate with said low-pressure chamber, said communicating tube allowing said communicating hole to communicate with said communicating passage when said piston arrives at a predetermined position by being displaced in the extending direction.

5. The hydropneumatic shock absorber as claimed in claim 2, wherein said piston has discharge amount adjusting means for reducing the rate at which the fluid of said pump means is discharged while said piston moves in the extending direction beyond a predetermined position.

6. The hydropneumatic shock absorber as claimed in claim 5, wherein said predetermined position is near a position at which said communicating means allows communication between said communicating passage of said hollow pump rod and said fluid chamber of said cylinder.

7. The hydropneumatic shock absorber as claimed in claim 6, wherein said communicating means comprises:

a communicating hole provided in said hollow pump rod so as to allow communication between said communicating passage of said hollow pump rod and an external space of said hollow pump rod; and a valve which slides along said hollow pump rod in response to said piston moving in an extending/contracting direction so as to open said communicating hole when said piston arrives at a predetermined position by being displaced in the extending direction, and said opening/closing mechanism comprises:

a sliding member which slides along said hollow pump rod so as to open or close said pump chamber communicating hole;

a first coil spring which, disposed between said sliding member and said valve, provides a pressing force applied from said valve to said sliding member; and a second coil spring which provides a pressing force applied from said pump piston to said sliding member.

8. The hydropneumatic shock absorber as claimed in claim 7, wherein said second coil spring is disposed between a spring engagement member fixed to said hollow pump rod and said sliding member in a space between said pump piston and said sliding member.

9. The hydropneumatic shock absorber as claimed in claim 5, wherein said discharge amount adjusting means includes a mechanism for allowing communication between said communicating passage of said hollow pump rod and said pump chamber when said piston moves in the extending direction beyond the predetermined position.

10. The hydropneumatic shock absorber as claimed in claim 5, wherein said discharge amount adjusting means comprises:

a pump chamber communicating hole provided in said hollow pump rod so as to allow communication between said communicating passage of said hollow pump rod and said pump chamber; and a opening/closing mechanism for opening said communicating hole when said piston moves in the extending direction beyond a predetermined position.

11. The hydropneumatic shock absorber as claimed in claim 5, wherein said discharge amount adjusting means includes an enlarged-diameter part having a larger diameter than that of said pump piston provided in said hollow piston rod, so that a predetermined gap is formed between said pump piston and the inner wall of said hollow piston rod when said piston is displaced in the extending direction beyond a predetermined position.

12. The hydropneumatic shock absorber as claimed in claim 2, wherein attracting means for attracting foreign matter included in the fluid is provided in the interior of said cylinder, in the interior of said hollow piston rod, or both in the interior of said cylinder and in the interior of said hollow piston rod.

13. The hydropneumatic shock absorber as claimed in claim 12, wherein said attracting means comprises permanent magnets.

14. The hydropneumatic shock absorber as claimed in claim 1, wherein attracting means for attracting foreign matter included in the fluid is provided in the interior of said cylinder, in the interior of said hollow piston rod, or both in the interior of said cylinder and in the interior of said hollow piston rod.

15. The hydropneumatic shock absorber as claimed in claim 14, wherein said attracting means comprises permanent magnets.

16. A hydropneumatic shock absorber comprising:

a cylinder having a fluid chamber filled with a fluid;

a high-pressure operating chamber which communicates with said fluid chamber;

a piston slidably provided in said fluid chamber in said cylinder;

a hollow piston rod having said piston at one end and being filled with the fluid;

a pump piston which, slidably provided in said hollow piston rod, partitions a space in said hollow piston rod into a pump chamber formed near said piston and a low-pressure chamber formed opposite said piston;

a hollow pump rod which has said pump piston at one end, said cylinder fixed to its other end, and a communication passage communicating with said low-pressure chamber;

a low-pressure operating chamber which communicates with the communicating passage which said hollow pump rod has;

pumping means which sucks the fluid in said low-pressure chamber into said pump chamber when said piston moves in the contracting direction, and discharges the fluid in said pump chamber into said fluid chamber in said cylinder when said piston moves in the extending direction; and communicating means which allows communication between said communication passage of said hollow pump rod and said fluid chamber of said cylinder, when said piston reaches a predetermined position after being displaced in the extending direction.

* * * * *